United States Patent [19]
Hamell et al.

[11] 4,156,031
[45] May 22, 1979

[54] STABILIZATION OF PURIFIED COFFEE OIL

[75] Inventors: Matthew Hamell, Orangeburg; Rex J. Sims, Pleasantville; Jacob R. Feldman, New City, all of N.Y.

[73] Assignee: General Foods Corporation, White Plains, N.Y.

[21] Appl. No.: 593,585

[22] Filed: Jul. 7, 1975

[51] Int. Cl.² ............................................. B23F 1/08
[52] U.S. Cl. .................................... 426/541; 426/386; 426/594; 426/610; 426/425
[58] Field of Search ................ 426/541, 542, 594–596, 426/610, 611, 386, 387, 424, 425, 330.6; 260/412.3, 424

[56] References Cited

U.S. PATENT DOCUMENTS

| 2,198,207 | 4/1940 | Musher | 426/542 |
|---|---|---|---|
| 3,354,188 | 11/1967 | Bock | 260/424 |
| 3,704,132 | 11/1972 | Strobel | 426/594 |

Primary Examiner—Norman Yudkoff
Attorney, Agent, or Firm—Thomas R. Savoie; Bruno P. Struzzi; Daniel J. Donovan

[57] ABSTRACT

Crude coffee oil is purified by removing substantially all of the diterpene esters by such means as acid treatment, chromatographic separation, steam vacuum distillation or high vacuum distillation. The purified coffee oil is then contacted with aqueous coffee extract in order to extract naturally-occurring antioxidants which will improve the stability of the purified coffee oil. The crude coffee oil may be obtained by pressing roasted coffee and/or water-extracted roasted coffee.

4 Claims, No Drawings

STABILIZATION OF PURIFIED COFFEE OIL

BACKGROUND OF THE INVENTION

Roasted coffee material has long been known as a source of oil which is useful as an aroma carrier and which has been used for the aromatization of soluble coffee. It has, however, been recognized that coffee oil contains a variety of compounds, most notably diterpene esters, which renders coffee oil quite dissimilar from other vegetable oils, such as cottonseed oil. Thus, because of its dark color, distinct flavor and high diterpene content, coffee oil has not been considered as an edible vegetable oil. Now, however, due to the increased demand on the world supply of vegetable oils, alternative sources of supply are being considered. Since roasted coffee oil is readily obtained from roasted coffee, including water-extracted or spent roasted coffee grounds which are at present considered a waste product of the soluble coffee industry, it has become increasingly practical to consider converting crude roasted coffee oil into a refined or purified edible oil. Purification of coffee oil obtained from spent coffee grounds, is also beneficial for stability purposes since crude oil from spent grounds, is significantly less stable than oil from unextracted roasted coffee.

It may also be desirable to employ a purified form of coffee oil in various soluble coffee aromatization techniques since purified coffee oil may be superior, from an organoleptic viewpoint, to crude coffee oil as a carrier for condensed coffee aromatics such as grinder gas aroma. Purified coffee oil combined with condensed grinder gas aromatics has been found to contain less instances of rubber boot and petrochemical flavor notes than its crude coffee oil/grinder gas counterpart.

Crude coffee oil can be obtained by utilizing extraction methods well-known in the art to obtain the oil from roasted coffee material which may be either in the whole bean or comminuted (e.g. ground) condition. The roasted coffee may be either unextracted or water-extracted; it being recognized that water-extracted ground roasted coffee will supply the most economical source of oil.

Generally, two basic oil extraction methods are employed in the art. The first comprises a liquid extraction process where extractives such as hexane are utilized to remove coffee oil from the roasted coffee. In this process the extractive after contact with the roasted coffee is removed to yield a residue of coffee oil. However, the far more common process comprises expressing coffee oil from roasted coffee by subjecting the coffee to extreme pressure conditions. The product of this process is often referred to as "expressed coffee oil," and since expressed coffee oil has the advantage of not requiring the addition of foreign materials to obtain the coffee oil, expressed coffee oil is most often utilized in coffee processing.

Conventional alkali refining, normally used in the production of edible oils, has not been effective on coffee oil because of its high content of unsaponifiables. A method has been disclosed, however, for the refining or purification of coffee oil such as the high vacuum distillation technique of U.S. Pat. No. 3,704,132. It has been found, however, that purified coffee oil which comprises primarily triglycerides and which is substantially free of diterpene esters has poor stability to oxidative rancidity.

If fresh purified coffee oil is promptly added to soluble coffee, such as by spray plating, the resulting stability is satisfactory for a period of only about several weeks. If the purified oil is stored for a period prior to use, off-flavors or even rancidity rapidly develop.

This invention relates to a method of protecting or stabilizing purified coffee oil so that it might be stored for prolonged periods and used either as a general purpose edible oil or in the aromatization of soluble coffee.

SUMMARY OF THE INVENTION

The process of this invention is directed to contacting purified coffee oil, that is coffee oil which comprises primarily triglycerides and which is essentially free of diterpene esters, with the natural coffee antioxidants contained in soluble coffee solids. Coffee oil may be purified as a result of refining techniques, such as high vacuum distillation, steam vacuum distillation or acid treatment, or chromatographic separation.

Contact between the purified coffee oil and the antioxidants may be effected by directly contacting the oil with soluble coffee solids such as those contained in an aqueous coffee extract. The oil may then be separated from the soluble coffee solids by suitable means such as centrifugation. Alternatively, the natural antioxidants could be first extracted from soluble coffee solids by an organic solvent such as methanol, and then extracted from the organic solvent by the purified oil. This contacting step stabilizes the purified oil to the development of oxidative rancidity by extracting into the oil at least some of the antioxidants naturally found in soluble coffee solids. These antioxidants replace those removed from the oil during the purification process and are not considered to be foreign or synthetic additives.

DETAILED DESCRIPTION OF THE INVENTION

This invention specifically relates to a process for stabilizing glyceride oils, specifically purified coffee oil, against oxidative rancidity by extracting natural antioxidants from aqueous coffee extracts. The extraction process comprises contacting the purified coffee oil with an aqueous coffee solution, such as reconstituted soluble coffee solids, and then separating the oil and aqueous phases.

Contact between the purified coffee oil and the aqueous extract will normally be accompanied by some type of agitation such as mixing or stirring. Contact must, of course, be carried out for a sufficient period of time to effect transfer of natural coffee antioxidants from the aqueous to the oil phase. As will be apparent to those skilled in the art, the time period will be dependent upon such factors as the volume ratio between the oil and aqueous phase, the amount of agitation and the temperature during contact. About thirty minutes of vigorous mixing has been found sufficient to insure sufficient transfer of antioxidants from the aqueous to the oil phase. At least ten minutes of agitated contact will normally be employed.

Crude coffee oil either expressed or solvent extracted from roasted coffee material, such as whole roasted coffee beans or spent coffee grounds, is known to contain significant amounts of non-glyceride materials most notably diterpene esters such as esters of cafestol and kahweol. Methods useful for the purification of crude roasted coffee oil to obtain a material comprised primarily of triglycerides and substantially free of diterpene esters are treatment with strong mineral acids, chromatographic separation, steam vacuum distillation and high vacuum distillation. Various other methods may also be suitable.

In each of these methods it may be desirable to first remove desirable aromatic fragrances from the crude oil prior to purification. Suitable means for accomplishing this are the use of sub-atmospheric pressures and mild temperature conditions as disclosed in U.S. Pat. No. 2,947,634 to Feldman et al. These aromatics may be condensed and subsequently added back to the purified and stabilized coffee oil or may be used to aromatize coffee or coffee-like products in any of the manners known to those skilled in the art. The purified and stabilized coffee oil with added-back aromatics will be highly suitable for use in aromatizing soluble coffee powders such as spray-dried and freeze-dried coffees. Suitable well-known techniques for combining coffee oil and soluble coffee are spray plating and injection.

According to the acid treatment purification process, crude coffee oil is contacted directly with an anhydrous, strong, mineral acid, preferably concentrated sulfuric or concentrated phosphoric acid. This contact produces a reaction which causes complete destruction and removal of the diterpene esters in the form of a charred, insoluble black sludge. This precipitate can then be removed or separated by filtration and/or centrifugation. In this case, it is necessary to use a sufficient quantity of the mineral acid (at least 2 moles for each mole of diterpenoid compound) to precipitate substantially all of the diterpenes present in the crude coffee oil. However, an excess of acid is not desired since excess acid affects the yield of purified coffee oil obtained. For sulfuric acid, this level will be in the ratio of 3-10 parts (preferably 5-6 parts) of acid for each 100 parts of crude coffee oil, depending on the amount of diterpenoids present in the oil which, in turn, depends on the blend of coffee beans. Generally, at least 5 parts of sulfuric for each 100 parts of oil will supply the stoichiometric amount needed but the yield will be affected if 5.5 parts of sulfuric are exceeded. The oil, which now contains only edible fatty acid esters, is steam-vacuum distilled to deodorize the purified oil, remove free fatty acids, and give a bland taste to the edible oil. If desired, the oil may be mixed with pulverized bleaching clay and subsequently filtered to improve the color of the oil prior to the deodorization step.

Another method of purifying the coffee oil involves the use of conventional steam-vacuum deodorization techniques used in the edible oil industry at a critical temperature range of 220° C. to 250° C. The use of high temperatures is necessary to cleave the ester linkage present in the diterpenoids and render the diterpenes volatile under vacuum conditions of 10 mm. or less, say 0.1 to 1 mm. At temperatures of below 220° C. the necessary cleavage of the ester linkage in the diterpenoids is not attained, or takes a protracted amount of time to be attained, and at temperatures of above 250° C. side-reactions occur which detract from the purification operation. Superheated steam can be used to obtain the desired product temperature in the oil. Substantially complete removal of the diterpenoids is not achieved for at least 12 hours and preferably at least 15 hours is necessary to obtain a purified oil.

High vacuum distillation techniques are also useful for the purification of coffee oil, as described in U.S. Pat. No. 3,704,132. According to this patent, crude coffee oil is first distilled at temperatures ranging from room temperature up to 115° C., at a pressure of from 0.1 mm. to 60 mm. for a time of up to 2 hours, and preferably from 1 to 2 hours. During this first distillation step, most of the highly volatile materials contained in the crude coffee oil are removed. After this first distillation procedure in which the distillate is either retained to capture some desirable aroma fragrances or discarded, the residue is utilized in the second step which comprises a second vacuum distillation. In this second vacuum distillation the temperature ranges from 115° C. to 240° C. and the pressure is maintained at pressures as low as possible, but in any event the pressure must be below 100 microns. This second vacuum distillation procedure is carried out at temperatures of from 115° C. to 240° C. at a maximum pressure of 100 microns for from about 1 to about 3½ hours. During this second distillation procedure a major portion of the undesirable constituents contained in the crude coffee oil are distilled off and subsequently discarded. These undesirable constituents include the previously described diterpene esters, other sterol esters, and decomposed rancidified aroma compounds. Subsequent to completion of the above identified second fraction distillation, a third fraction distillation is completed. During this third fraction distillation temperatures from 240° C. to 310° C. are employed, and the vacuum is maintained at from 10 to 20 microns pressure absolute. The third fractional distillation is continued for from about 1½ to approximately 4 hours. Temperatures above 310° C. should be avoided because at the pressure conditions utilized herein temperatures much above that will decompose the desirable triglyceride component. The purified triglyceride component is distilled over predominantly in this third fraction.

Chromatographic separation using a fixed bed of activated alumina as the adsorbent may be employed to obtain a relatively pure triglyceride fraction. Preferably, the oil will be passed through the adsorbent bed while dissolved in a liquid medium such as petroleum ether.

This invention is further illustrated but not limited by the following examples:

EXAMPLE 1

Whole roasted coffee beans were expressed in a screw or auger type of press at a pressure of at least 5,000 p.s.i. to obtain crude coffee oil. The oil recovered had a temperature of about 100° C. and the coffee meal residue had a temperature of between 75° and 150° C. The oil was then clarified to remove fines and foots in the oil to less than 0.5%. The volatile aromatic constituents of the expressed oil were then distilled by evaporation from a rapidly moving film of the oil formed on a moving surface at temperatures of about °50° C. and a pressure of below 25 mm. of mercury. The aromatics were collected as a frost in a liquid nitrogen cold trap (−196° C.).

About 2,961 grams of the dearomatized coffee oil was placed in a beaker and 148 grams (5% by weight) of $H_2SO_4$ (98% concentration) was added with stirring over a 5 minute period. There was an exotherm to 45° C. and a black sludge separated. Stirring was continued for 60 minutes until the oil temperature dropped to 30° C. Then the mixture was diluted with an equal volume of petroleum ether (b.p. 30°–60° C.) and centrifuged for 15 minutes at 5,000 R.P.M. The ether solution was decanted, the sludge transferred to a beaker, and reslurried with 1.1 of petroleum ether. This mixture was then centrifuged and the combined ether solutions were filtered with suction through a diatomaceous earth filter. Solvent was distilled off and the residual oil was stirred for 30 minutes at 90° C. with 95 grams of bleaching clay. The oil was then steam-vacuum deodorized for 4 hours at 210° C. and 0.5 mm. pressure. The oil was cooled to 60° C. under vacuum with continuous steam stripping before air was readmitted. The yield of purified bland, odorless oil was 1,480 grams, or 50% recovery.

Absence of the diterpenoids cafestol and kahweol was shown by analysis of the purified coffee oil via gas-liquid chromatography, thin-layer chromatography, and nuclear magnetic resonance. By all these methods, no diterpenes were found in the $H_2SO_4$ purified oil.

EXAMPLE 2

Coffee oil purified with concentrated sulfuric acid as in Example 1 was treated and evaluated as follows, the peroxide values reported being in direct relation to the development of odors within the purified oil:

| Flask 1 | Flask 2 (Control) |
|---|---|
| 80 g purified oil | 80 g purified oil |
| 75 ml H₂O | 75 ml H₂O |
| 25 g spray-dried coffee solids | |

The coffee solids were dissolved in the $H_2O$ before adding to the flask. Both flasks were flushed with $CO_2$, stoppered and agitated with a mechanical shaker overnight. Then the contents were centrifuged to separate the phases. The oil layers were decanted and tested with and without 0.02% BHT addition for stability using the Schaal oven test (60° C). The following peroxide value data was obtained from that test:

| | Peroxide Values (meg/kg) | | | | |
|---|---|---|---|---|---|
| Days at 60° C. | 0 | 2 | 5 | 10 | 13 |
| Control | 2 | 17 | 45 | 81 | 90+ |
| Control (+BHT) | 2 | 17 | 43 | 75 | 90+ |
| Extract | 2 | 4 | 5 | 9 | 12 |
| Extract (+BHT) | 2 | 4 | 4 | 8 | 11 |

The control oil (with or without BHT) shows a rapid increase in peroxide value and develops a rancid odor within a few days. The extract oil retains its bland odor even after several days in this accelerated test. BHT gives virtually no additional protection over that obtained by the extraction.

EXAMPLE 3

Portions of the control oil and the extract oil of Example 2 (both without BHT) were combined with grinder gas aromatics and then injected into glass jars containing spray-dried soluble coffee powder, at a level of 0.4% oil by weight of powder. The glass jars were then sealed under an inert atmosphere. After 8 weeks storage at room temperature and 6 weeks at 95° F., the control oil plated powder was detected as being rancid; whereas, the extract oil plated powder continues to remain stable after 20 weeks at both room temperature and 95° F.

Having thus described the invention, what is claimed is:

1. A method for producing a stable purified coffee oil which is substantially free of diterpene esters comprising the steps of:
    (a) treating coffee oil to remove substantially all of the diterpene esters, and
    (b) agitating the treated coffee oil with an aqueous coffee extract, said agitation being carried out for a period of at least ten minutes and sufficient time to effect transfer of natural coffee antioxidants from the aqueous extract into the oil, and thereafter,
    (c) separating the oil and aqueous phases.

2. The method of claim 1 wherein the treated coffee oil is contacted with an aqueous coffee solution prepared by reconstituting soluble coffee solids.

3. The method of claim 1 wherein the coffee oil is obtained from water-extracted roasted coffee material.

4. The method of claim 3 wherein the coffee oil is expressed from the water-extracted roasted coffee.

* * * * *